(12) United States Patent
Cid-Aguilar et al.

(10) Patent No.: US 9,115,021 B2
(45) Date of Patent: Aug. 25, 2015

(54) NEUTRAL GREY GLASS COMPOSITIONS

(71) Applicants: Jose Guadalupe Cid-Aguilar, Monterrey (MX); Roberto Marcos Cabrera-Llanos, Santiago (MX); Miguel Angel Kiyama-Rodriguez, Monterrey (MX)

(72) Inventors: Jose Guadalupe Cid-Aguilar, Monterrey (MX); Roberto Marcos Cabrera-Llanos, Santiago (MX); Miguel Angel Kiyama-Rodriguez, Monterrey (MX)

(73) Assignee: VIDRIO PLANO DE MEXICO, S.A. DE C.V., Nuevo Leon (MX)

( * ) Notice: Subject to any disclaimer, the term of this patent is extended or adjusted under 35 U.S.C. 154(b) by 0 days.

(21) Appl. No.: 14/209,502

(22) Filed: Mar. 13, 2014

(65) Prior Publication Data

US 2014/0342896 A1 Nov. 20, 2014

Related U.S. Application Data

(63) Continuation of application No. PCT/MX2011/000108, filed on Sep. 14, 2011.

(51) Int. Cl.
*C03C 3/095* (2006.01)
*C03C 3/087* (2006.01)
*C03C 3/078* (2006.01)
*C03C 4/02* (2006.01)

(52) U.S. Cl.
CPC ............. *C03C 3/095* (2013.01); *C03C 3/078* (2013.01); *C03C 3/087* (2013.01); *C03C 4/02* (2013.01); *C03C 2204/00* (2013.01)

(58) Field of Classification Search
CPC ............ C03C 3/087; C03C 3/095; C03C 4/02
USPC .................................................. 501/64, 70, 71
See application file for complete search history.

(56) References Cited

U.S. PATENT DOCUMENTS

| | | | | |
|---|---|---|---|---|
| 6,521,558 B2 * | 2/2003 | Landa et al. | ............ | 501/64 |
| 7,691,763 B2 * | 4/2010 | Arbab et al. | ............ | 501/64 |
| 2004/0186001 A1 * | 9/2004 | Seto et al. | ............ | 501/70 |
| 2005/0170944 A1 * | 8/2005 | Arbab et al. | ............ | 501/64 |
| 2007/0099788 A1 * | 5/2007 | Shelestak et al. | ............ | 501/64 |
| 2007/0161492 A1 | 7/2007 | Smith et al. | | |

FOREIGN PATENT DOCUMENTS

| | | |
|---|---|---|
| EP | 1041050 | 10/2000 |
| EP | 1270524 | 1/2003 |

OTHER PUBLICATIONS

International Search Report of PCT/MX2011/000108, dated May 18, 2012 (1 pg.).

* cited by examiner

*Primary Examiner* — Anthony J Green
*Assistant Examiner* — Elizabeth A Bolden
(74) *Attorney, Agent, or Firm* — Shlesinger, Arkwright & Garvey LLP

(57) ABSTRACT

The present invention relates to a neutral grey glass composition which has a basic composition containing the following main coloring agents: 0.40 to 0.80% of $Fe_2O_3$; 0.05 to 2.0% of $TiO_2$; 0.2 to 2.5% of $Er_2O_3$; 20 to 200 ppm of CuO; 0.08% to 0 0.1% charcoal; and 15% to 50% of ferrous (redox), in which the glass has light transmission "A" greater than 65%, solar transmission ($T_S$) <55%, and ultraviolet transmission <40%, having color values $a^*=-4$ to 3 and $b^*=4$ to $-2$.

6 Claims, No Drawings

NEUTRAL GREY GLASS COMPOSITIONS

BACKGROUND OF THE INVENTION

A. Field of the Invention

The present invention relates to a neutral grey glass composition, which has a basic silicon-sodium-calcium composition containing the following main coloring elements: 0.40% to 0.80% $Fe_2O_3$; 0.05% to 2.0% $TiO_2$; 0.2% to 2.5% $Er_2O_3$; 20 to 200 ppm of CuO; 0.08% to 0.1% charcoal; and 15% to 50% ferrous (redox), in which the glass has light transmission under illuminant "A" greater than 65%, solar transmission (TS)<55%, and ultraviolet transmission <40%, having color values a*=−4 to 3 and b*=4 o−2.

B. Description of the Related Art

Colored glass is glass to which, during the manufacturing process, metallic oxides and some colorants such as selenium metal are added. As a result of previous research, it is known that the incorporation of selenium results in a salmon pink coloring, the combination of iron oxide and selenium $Fe_2O_3$—Se gives glass a brownish-reddish coloring; in addition, ultraviolet, visible and solar radiation transmissions are reduced. Furthermore, the incorporation of cobalt oxide $(Co_3O_4)$ results in a blue coloring, the combination of iron-cobalt oxides confers tones which vary from violet blue (low iron) to dark blue with a greater concentration of iron oxide. Modifying the quantity and ratio of the three colorants "selenium-iron and cobalt oxide", when added to oxide-reduction conditions in the glass blending/mixing atmosphere, one obtains glass with high transmission of light, good blockage of solar heat and also colors, including grey.

Grey glass is traditionally obtained from the combination of various colorants: green is generated by iron oxide $(Fe_2O_3)$, pink by Selenium (Se) and blue via cobalt oxide $(Co_3O_4)$; some patents replace $(CO_3O_4)$ with nickel oxide (NiO) and manganese oxide (MnO).

Neutral colored glass with low light transmission can be processed by the combination of colorants $Fe_2O_3$—Se—, $Co_3O_4$ modifying the concentrations and ratios.

Various patents have been developed for obtaining grey glass, for "automotive" purposes, which have a light transmission of greater than 70, which complies with the U.S. Federal Motor Vehicle Safety Standards. In the case of the construction industry, there is no restriction, and smaller values can be used, as well as thicknesses of between 1.6 and 12 mm.

The glasses described in almost all prior art patents refer to a type of grey glass for automotive purposes, which are based on three basic components: iron oxide, cobalt oxide, and selenium. These components are also combined with nickel oxide or manganese oxide, commonly called manganese dioxide, using different proportions, and together with the typical glass formulation of silicate-sodium-calcium, constitute the basic composition of the glass.

The Effect of Iron Oxide $(Fe_2O_3)$ on Silicate-Sodium-Calcium Glass

Iron is present in (silicate-sodium-calcium) glass in two states of oxidation: as ferrous oxide (FeO) and ferric oxide $(Fe_2O_3)$. Each state of oxide reduction confers different properties; the ferrous ion has a wide and strong absorption spectrum centered at 1050 nm, which translates into a reduction in infrared radiation. In addition, this spectrum extends to the realm of the visible, reducing the transmission of light and providing a bluish coloring to the glass; on the other hand, the ferric ion has a strong absorption spectrum centered in the ultraviolet region, which impedes the transmission of ultraviolet radiation through the glass, and two other weaker spectra in the visible region, located between 420 nm and 440 nm, which causes a slight reduction in light transmission and a yellowish coloring in the glass [1,2].

The balance between ferrous and ferric oxide has a direct effect on the color and transmission effects of the glass.

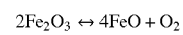

The above means that the greater the quantity of ferric iron $(Fe^{+3})$ present in the glass, the greater the absorption of ultraviolet radiation and the transmission of light will increase; as well as the yellowish tone; but if the content of ferrous iron $(Fe^{+2})$ increases as the result of the chemical reaction of $Fe_2O_3$, the absorption of infrared radiation will increase, but the absorption of ultraviolet radiation decreases, along with the transmission of light (which is undesirable).

$$Fe^{3+}(Yellow) \leftrightarrow Fe^{2+}(Blue)[Yellow + Blue = Green]$$

$$2Fe_2O_3 \leftrightarrow 4FeO + O_2$$

The variation in the concentration of FeO in relation to $Fe_2O_3$ gives rise to a change in the color of the glass. The displacements in the tones can be modified from yellow (lower Tuv, greater TL and Ts), through green, blue until reaching amber. From prior experimental results, it has been found that the color changes in the following way.

Yellow—Low ferrous (12%)-High light transmission (High ferric ion)

Greenish-yellow (16%)

Yellowish-green (20%)

Green (25% typical value for green glass)

Bluish-green (29%)

Greenish-blue (35%)

Blue (50%)

Olive green (60%)

Champagne (65%)

Amber—High ferrous (75%)-Low light transmission (low ferric ion)

In order to control the balance between the ferrous and ferric oxide and to achieve solar control glass, it is necessary to establish various conditions, in the mix and in the melting atmosphere. In the former case, the concentration of reduction agents like carbon and oxidants, like sodium sulfate and sodium nitrate. In terms of the melting conditions, the atmosphere has to be adjusted with a greater or lesser oxygen content depending on the desired thermal performance and shading of the glass.

The Effect of Titanium Oxide $(TiO_2)$ on Silicate-sodium-calcium Glass

The most stable form of titanium in glass is tetravalent $(Ti^{4+})$, which is explained by its $3d^0$ electronic configuration [Fernandez Navarro J. M. "El vidrio"; Superior Council of Scientific Research, Madrid, 1991]. The trivalent form could confer coloring, however this effect is no found in sodium-calcium-silicate glass [Weyl A. Woldemar "Colored Glasses", Society of Glass Technology, Scheffiel, 1976]. The document "Effects of titanium dioxide in glass" by M. D. Beals, The Glass Industry, September 1963, pp. 495 to 531, describes the interest that has been shown in titanium dioxide as a constituent of glass. The effects produced by the use of titanium dioxide, including the comments that $TiO_2$ increases the refraction index to a great extent, increases light absorption in the ultraviolet region, and results in lower viscosity and surface tension. The data on the use of titanium dioxide in enamels indicates that $TiO_2$ increases chemical durability and acts as a dissolvent. In general, clear glass that contains titanium dioxide can be found in all common glass formation systems (borates, silicates and phosphates). The different glass formation regions for systems which contain titanium dioxide are not grouped together in the same place, since the organization of the discussion is based more on the properties and uses of glasses that contain titanium dioxide, rather than simply their makeup.

The Effect of Copper Oxide (CuO) on Silicate-sodium-calcium Glass

Copper oxide normally gives silicate-sodium-calcium glass a blue-turquoise coloring, and a reduced light transmission, due to a wide spectrum of absorption located in the visible region, centered at approximately 780 nm. Nonetheless, this spectrum extends to the nearby infrared and ultraviolet spectrums, causing a slight reduction in these types of radiations in the glass. The bluish coloring is associated with the presence of the divalent copper ion, but copper can be present in its monovalent state and not give off color.

Therefore, the coloring and the properties that are conferred by this compound depend not only on the quantity of copper present in the glass, but also on the balance between the two states of oxidation [Bamford C. R., "Color Generation and Control in Glass," Elsevier, 1977].

Copper oxide is incorporated as a key element for developing the bluish coloring necessary to adjust the neutral grey tone [U.S. Pat. No. 7,902,097].

The Effect of Selenium in Silicate-sodium-calcium Glass

The addition of selenium to silicate-sodium-calcium glass can produce a pinkish coloring due to the presence of atomic selenium. Selenium is one of the most widely used physical decolorants for glass with traces of iron resulting from an undesirable impurity in the raw materials, due to the fact that its coloring neutralizes the ferrous and ferric ions present in the glass[Bamford C. R., "Color Generation and Control in Glass," Elsevier, 1977; Fernandez Navarro J. M. "El vidrio"; Superior Council of Scientific Research, Madrid, 1991].

The combination of iron and selenium in silicate-sodium-calcium glass confers a reddish-brown coloring and a decrease in light transmission, due to an absorption spectrum located in the visible region between 490 and 500 nm (a spectrum similar to that of atomic selenium). This spectrum extends to the ultraviolet region, also causing a decrease in this type of transmission in the glass.

The intensity of the coloring and the final properties of the glass are a function of the concentration of iron oxide and selenium in the glass.

For concentrations above 0.1% $Fe_2O_3$, selenium must be used together with small quantities of cobalt oxide <0.0001%, to better compensate the tonality of the iron; these mixtures achieve a neutral tone, however there is some impact on the visible transmission [Fernandez Navarro J. M. "El vidrio"; Superior Council of Scientific Research, Madrid, 1991].

The Effect of Erbium Oxide ($Er_2O_3$) on Silicate-sodium-calcium Glass

In recent years, the use of rare earth oxides, in the forms either of pure oxides or concentrates from various rare earth elements, have been gaining importance in the areas of both research and practical applications. Some studies treat the decolorizing effect of erbium oxide as a physical decolorant, which is explained by the characteristic pink color that it is capable of transmitting to the glass.

Research allows us to reach the conclusion that erbium oxide is an excellent physical decolorant for silicate-sodium-calcium glass. In the base glass studied (0.033% $Fe_2O_3$, $Fe^{2+}/Fe^{3+}=0.26$), we would require approximately 0.040% $Er_2O_3$ in order to achieve a satisfactory effect. The amounts of erbium oxide will naturally vary as a function of the iron content of the glass and the chemical decolorizing system used. For other types of glass, the use of the proposed calculation system would make it possible to deduce the most appropriate quantities of erbium for decolorization [Reference Gago Garcia R. E., Tamargo Joglar A., *Estudio teórico práctico del empleo del óxido de erbio como decolorante del vidrio silico-sodico-calcico*, Scientific Conference on Ceramics and Glass, University de Oviedo and the Spanish Ceramics and Glass Society, 1981].

Erbium oxide has some advantages compared to selenium, because of its chemical stability and the ease in managing dosages and control, since it is not volatile. In addition, the specific direction in which it acts on color is also clearly preferable.

We currently have knowledge of some developments that use basic components to produce colored glass, for example U.S. Pat. No. 7,071,133, by Arbab, et al, granted on Jul. 4, 2006, has a glass redox value of between 0.2 and 0.675; U.S. Pat. No. 6,821,918 by Boulos, et al, granted on Nov. 23, 2004, in which iron oxide, cobalt oxide, selenium and manganese are used as the principal components. The manganese compound is present in a quantity of from 0.1 to 0.5% by weight, but based on the $MnO_2$ in the composition of the glass. The presence of manganese substantially prevents the formation of the color amber. This manganese compound can be added to the glass load components in a variety of ways, for example (but not limited to) $MnO_2$, $Mn_3O_4$, MnO, $MnCO_3$, $MnSO_4$, $MnF_2$, $MnCl_2$, etc.

Some other glasses described in other patents, like those mentioned in the paragraphs below, in addition to the three compounds mentioned, have different metallic elements that confer the characteristics to the final product, which allow them a TLA >70%, so that they can be used in construction and in the automotive industry.

For example, U.S. Pat. No. 6,114,264, of Krumwiede, et al, granted on Sep. 5, 2000, in which the color of the glass is characterized by dominant wavelengths in the range of 480 to 555 nanometers, an excitation purity of no more than 8 percent, and a luminous transmission factor of 70 percent or more in a thickness of 3.9 millimeters. U.S. Pat. No. 6,998,362 of Higby, et al, granted on Feb. 14, 2006, in which the color of the glass is characterized by a dominant wavelength of less than 560 nanometers, with a color purity of no more than 6 percent and a visible light transmission of 70 percent or greater at a thickness of 4 millimeters, and in which the total percentage reduction of iron is between 21% and 34%. U.S. Pat. No. 7,179,763, of Teyssedre, et al, granted on Feb. 20, 2007, in which the glass has an overall light transmission under illuminant A of greater than 67% for a glass thickness of 3.85 mm; and U.S. Pat. No. 5,958,811 of Sakaguchi, et al, granted on Sep. 28, 1999, in which an infrared and ultraviolet radiation absorbing glass composition has a visible light transmission of 70% of more, measured with the standard CIE illuminator, when said glass has a thickness of between 3.25 and 6.25 mm. The composition of the glass includes CoO, Se and $Fe_2O_3$, as principal components, as well as rare earth elements $CeO_2$ and $La_2O_3$.

U.S. Pat. No. 6,235,666 (Cochran, et al), U.S. Pat. No. 6,403,509 (Cochran, et al) and U.S. Pat. No. 6,498,118

(Landa, et al), U.S. Pat. No. 6,573,207 (Landa, et al), U.S. Pat. No. 6,521,558 (Landa, et al), U.S. Pat. No. 6,716,780 (Landa, et al), U.S. Pat. No. 7,135,425 (Thomsen, et al) and U.S. Pat. No. 7,151,065 (Thomsen, et al) are related to glasses with a luminous transmission of over 70 percent. Their main colorants are CoO, Se, and $Fe_2O_3$. Se and CoO can be totally or partially replaced by a combination of rare earth elements, such as $Er_2O_3$, $Y_2O_3$, $Ho_2O_3$, $CeO_2$. Glass compositions related to the use of rare earths are included in U.S. Pat. No. 6,521,558 (Ksenia A., Landa, et al) and U.S. Pat. No. 6,573,207 (Ksenia A., Landa, et al), which are related to a grey glass composition which employ as a colorant at least ferric/ferrous oxide and erbium ($Er_2O_3$), and also preferably selenium and cobalt. U.S. Pat. No. 6,498,118 (Ksenia A., Landa, et al) refers to a glass composition that employs a colorant portion of at least one iron (total iron expressed as $Fe_2O_3$), erbium (e.g., $Er_2O_3$) and holmium (e.g., $Ho_2O_3$).

Furthermore, U.S. Pat. No. 5,308,805, of Baker et al, granted on May 4, 1994, describes a neutral grey glass with a low transmission, in which one of the elements claimed is nickel oxide in proportions of from 100 to 500 ppm.

In the past, the absorption of heat absorbing grey glasses which contained nickel in their structure frequently formed, during the melting of the glass, nickel inclusions in the form of sulfide, which appeared as small invisible particles that were impossible to see once the glass was formed. These nickel sulfide inclusions, due to their high thermal expansion coefficient, can cause thermal tensions sufficient to fracture a plate of glass. This is especially a problem when the glass pieces are subjected to thermal treatment, such as tempering, in which the presence of nickel sulfide causes an excessively high incidence of breakage as a result of the tempering process.

An additional disadvantage of glass which contains nickel is the change in color which they are subject to after the thermal process, for instance after tempering.

Furthermore, U.S. Pat. No. 5,308,805, of Baker et al, issued on May 4, 1994, describes a low transmission neutral grey glass, in which one of the components claimed is nickel oxide in proportions of between 100 to 500 ppm.

In the past, heat absorbing grey glass which contained nickel in their structure frequently presented with inclusions in the form of nickel sulfide which, during the melting of the glass, formed and appeared as small invisible particles that were impossible to see with the naked eye once the glass was formed. These nickel sulfide inclusions, due to their high thermal expansion coefficient, can cause thermal tensions sufficient to fracture a plate of glass. This is especially a problem when the glass pieces are subjected to thermal treatment, such as tempering, in which the presence of nickel sulfide causes an excessively high incidence of breakage as a result of the tempering process.

An additional disadvantage of glass which contains nickel is the change in color which they are subject to after the thermal process, for instance after tempering.

U.S. Pat. No. 5,023,210 of Krumwide et al, issued on Jun. 11, 1991, describes a neutral, low transmission grey glass composition (the glass has a luminous transmission of less than 20%) which does not use nickel. In order to achieve characteristics similar to that of a neutral grey glass, Krumwide uses chromium oxide in quantities of 220 to 500 ppm of $Cr_2O_3$ in the composition, which in these proportions produces a grey tone and adjusts the levels of selenium and cobalt oxide to make the tone neutral. Nevertheless, in earlier references, there is mention that it is preferable to not use these compounds, due to problems that arise because of the difficulty in melting the chromium compounds (U.S. Pat. No. 4,837,206) and in addition, due to the fact that it is difficult to get rid of the solid materials that these compounds contain. Similarly, U.S. Pat. No. 5,308,805 mentions the problem of using chromium oxide as a coloring agent, since it requires the use of additional non-conventional operations and machinery within the furnaces, in order to obtain the necessary conditions to produce the desired glass.

U.S. Pat. No. 5,346,867, of Jones et al, granted on Sep. 13, 1994, describes a heat-absorbent glass composition, with a neutral gray color, which uses manganese and titanium oxide to increase the retention of selenium (which is a high-cost component) during the production process. The neutral grey glass with a control thickness of 4 mm, light transmission using A illuminant of 10.0% to 55.0%. Although from previous references (U.S. Pat. No. 4,873,206) we know that the use of manganese tends to form a yellowish-brown coloring when it is exposed to ultraviolet radiation, making it difficult to maintain uniformity in the product, and the use of titanium causes a yellowish coloring when the glass enters into contact with the molten tin from the floating process. This is what makes these two components undesirable during the glass production process, since coloring control is critical to obtaining the desired tone in manufacturing. Jones and others mention in their '867 patent that the solarization process is a phenomenon associated with the change from $Fe^{3+}$ to $Fe^{2+}$, which causes an undesirable change in the color; also they found that this does not happen in the glass described and additionally, the use of titanium oxide is incorporated into the glass to obtain the desired range of dominant wavelength, as well as to reduce the transmission of ultraviolet radiation.

Additionally, it is well known by people familiar with the art that the addition or substitution of one or more colorants by another or others, or a change in the relative proportion of the colorant in the composition of the glass, affects not only the color of the product, as for example the dominant wavelength of the color or the excitation purity, but also the light transmission, the heat absorption and other properties such as ultraviolet and infrared radiation transmission.

It is well known that copper has played an important role in the production of glass, ceramics and colored pigments. The coloring of Persian ceramics has been recognized, for example, for its tone conferred by copper. Of special interest to ceramic artists are turquoise blue and especially the Egyptian and Persian dark blue (Waldemar A. Weil; Colored Glasses, Society of Glass Technology, Great Britain, p. 154-167, 1967).

Copper has been used in glass compositions, not only in the silicate-sodium-calcium type, but in some others, such as those which contain for example borosilicate. Therefore, the color developed depends on the foundation of the glass, its concentration and its state of oxidation.

In the case of the glass referred to as the base, copper in oxide form provides a greenish tone of blue coloring, specifically turquoise; however, in glass, copper can be in its monovalent state, which does not impart color. Thus, the greenish blue hue depends not only on the quantity of copper present, but also on the ionic balance between the cupric and cuprous states. The maximum absorption of copper oxide is found in a spectrum centered around 780 ηm, and a weak maximum secondary peak is present at 450 ηm, which disappears at high soda contents (around 40% weight) (C.R Bamford, Color Generation and Control in Glass, Glass Science and Technology, Elsevier Scientific Publishing Company, p. 48-50, Amsterdam, 1977).

In the production of red ruby glass, a mixture containing copper oxide together with any reducer agent (SnO is commonly used), is melted in reduced conditions. The initial mixture shows the blue characteristic color of the copper II, but as soon as the melting begins, changes the color to a pale straw yellow which takes place during this stage. Due to a thermal treatment to a temperature between the annealing point and the softening point, the ruby red color is developed. If, during the melt, the reduction state is carried out beyond a critical stage, the color changes to brown and appears opaque or "turned off". On the other hand, if the copper is insufficiently reduced, some traces of blue color are kept and the ruby red color is not developed (Amal Paul, Chemistry of Glasses, Chapman and Hall, p. 264-270, London, 1982).

U.S. Pat. No. 2,922,720 of Parks and others, granted on Jun. 20, 1957, discusses the use of copper in glass: " . . . Copper has long been used as a coloring agent for glass-to develop a ruby coloration; but in order to obtain the desired effect in open or tank furnace melting, it has been necessary to use, in conjunction with the copper, cyanogens as reducing agents . . . ." It also mentions the effect of copper in the coloring of the glass as due to the colloidal suspension of metallic copper particles in the glass, and by analogy it is believed that a particle size produces ruby red coloring, with the intensity of the color depending on the concentration of copper. For smaller size particles, the color effect is null.

According to the above, this invention incorporates the use of erbium oxide as a decolorant to neutralize the greenish tone conferred by the iron oxide necessary to reduce solar transmission; in addition, the incorporation of titanium is intended to reduce UV transmission with the effect of moving the color toward yellowish tones. Finally, copper oxide is used to adjust the coloring given by the titanium and the oxides present in the iron. The incorporation of copper oxide confers a bluish tone, and the use of cobalt oxide, which has traditionally been used for this purpose, is avoided.

The erbium oxide has advantages over selenium, due to its chemical stability and the ease of dosing and control, as a non-volatile substance. In addition, the specific direction in which it acts on color is clearly favorable.

The study published in the Scientific Conference on Ceramics and Glass ("*Jornadas Cientificas sobre ceramica y vidrio*") leads us to the conclusion that erbium oxide is an excellent physical decolorizing agent for sodium-calcium-silicate glasses. Its conclusions were that a base glass of 0.03% $Fe_2O_3$ and 26% redox would require approximately 0.040% $Er_2O_3$, to achieve a satisfactory effect.

Alternatively, in some examples selenium is incorporated in order to complement the reddish coloring, which is necessary to adjust the green color.

Following on the above, a sodium-calcium-silicate base composition, comprised of: from 0.40 to 0.80% $Fe_2O_3$, 0.05 to 2.0% $TiO_2$, 0.2 to 2.5% $Er_2O_3$, from 20 to 200 ppm of CuO; <10 ppm of Se; 0.0 to 0.1% carbon; and 15 to 50% ferrous (redox) has a light transmission of >65%, solar transmission ($T_S$) <55%, ultraviolet transmission <40%, with color values of a*=−4 to 3, and b*=4 to −2.

SUMMARY OF THE INVENTION

It is therefore a primary objective of this invention to provide a neutral grey glass composition that incorporates the use of erbium oxide as a decolorant to neutralize the greenish tone conferred by the iron oxide necessary to reduce solar transmission.

A primary objective of this invention is to provide a neutral grey glass composition in which the quantity of copper oxide is between 20 and 200 ppm CuO, and its effect on the process is a critical part of the glass composition.

An additional goal of this invention is to provide a neutral grey glass composition which optionally can incorporate selenium, to complement the reddish coloring necessary to adjust the green color.

These and other objectives of the neutral grey glass of this invention will be evident to experts in the field from the following detailed description.

DETAILED DESCRIPTION OF THE INVENTION

The typical composition of sodium-calcium-silicate glass used in the automotive industry, and formed through the process known as glass floating, is characterized by the following formulation, based on percentages by weight with respect to the total weight of the glass:

| Components | % weight |
| --- | --- |
| SiO2 | 68-75 |
| Al2O3 | 0-5 |
| CaO | 5-15 |
| MgO | 0-10 |
| Na2O | 10-18 |
| K2O | 0-5 |
| SO3 | 0.05-0.3 |

The composition of neutral grey glass of the present invention is based on the composition described above, to which the following coloring compounds have been added to obtain a grey color:

| Components | % weight |
| --- | --- |
| $Fe_2O_3$ | 0.40-0.80% |
| $TiO_2$ | 0.05-2.0% |
| $Er_2O_3$ | 0.2-2.5% |
| CuO | 20-200 ppm |
| Carbon | 0-0.10% |
| ferrous (redox) | 15-50% |

The composition of the glass could also include selenium in quantities of <10 ppm, in order to complement the reddish coloring used to adjust the green.

The glass would have a light transmission of >65%, solar transmission ($T_S$) <55%, ultraviolet transmission <40%, with color values of a*=−4 to 3, and b*=4 to −2.

The following are specific examples of the sodium-calcium-silicate composition according to this invention, with the corresponding physical properties of visible, infrared and ultraviolet transmission for glass with a thickness of between 3.74 and 4.53 mm.

Tables 1 to 5

The examples shown in Tables 1 to 5 contain the results of the sodium-calcium-silicate composition in combination with the coloring agents listed above. Examples 1 to 9 and 13 show the results of the sodium-calcium-silicate composition without the addition of copper oxide (CuO) and selenium. Example 1 shows that the glass composition without CuO, selenium, $TiO_2$ and $Er_2O_3$ affects UV transmission, which is greater than 40.

In examples 10 to 12 and 14 to 35, we added copper oxide to adjust the color conferred by the titanium and the oxides present in the iron. The incorporation of copper oxide gives a bluish tone. With the exception of examples 10 and 14, the light transmission remains above 65. The properties and the coloring are for glass with a thickness of between 3.8 and 4.53 mm.

Examples 25-27 and 29-31 optionally show the addition of selenium to complement the reddish coloring necessary for adjusting the color.

With the exception of examples 1, 2, 10, 14 and 16, the composition of the glass has a light transmission of >65%, solar transmission ($T_S$)<55%, ultraviolet transmission <40%, with color values of a*=−4 to 3, and b*=4 to −2.

All of the compositions can be produced using a commercial float glass process well known in the art.

TABLE 1

| Example | 1 | 2 | 3 | 4 | 5 | 6 | 7 |
|---|---|---|---|---|---|---|---|
| Thickness (mm) | 3.83 | 4.10 | 4.09 | 4.10 | 3.85 | 3.85 | 3.74 |
| Composition | | | | | | | |
| % $Fe_2O_3$ | 0.535 | 0.535 | 0.535 | 0.535 | 0.600 | 0.600 | 0.600 |
| % Ferrous (Redox) | 29.1 | 28.3 | 29.1 | 25.4 | 26.5 | 25.1 | 27.0 |
| % FeO | 0.156 | 0.151 | 0.156 | 0.136 | 0.159 | 0.151 | 0.162 |
| Ppm Se | 0.0 | 0.0 | 0.0 | 0.0 | 0.0 | 0.0 | 0.0 |
| Ppm CuO | 0 | 0 | 0 | 0 | 0 | 0 | 0 |
| % $TiO_2$ | 0.0 | 0.4 | 0.4 | 0.4 | 0.8 | 0.8 | 0.8 |
| % $Er_2O_3$ | 0.0 | 0.0 | 0.5 | 1.0 | 0.5 | 1.0 | 1.5 |
| % Carbon | 0.048 | 0.048 | 0.048 | 0.048 | 0.050 | 0.050 | 0.049 |
| % Tuv | 47.8 | 41.7 | 38.4 | 37.2 | 36.3 | 34.6 | 31.9 |
| % $T_{LA}$ | 75.0 | 76.7 | 71.6 | 72.6 | 75.6 | 73.7 | 71.8 |
| % Ts | 53.4 | 52.8 | 50.0 | 52.5 | 51.5 | 52.1 | 50.4 |
| L* | 90.2 | 90.9 | 88.3 | 88.5 | 91.1 | 88.8 | 89.2 |
| a* | −5.8 | −6.6 | −3.8 | −1.2 | −3.9 | −1.5 | −0.1 |
| b* | −0.9 | 1.5 | −0.2 | −0.8 | 2.4 | 1.8 | 1.3 |
| % Purity | 3.4 | 4.6 | 2.0 | 1.3 | 1.8 | 1.6 | 1.3 |
| Dominant wavelength (nm) | 487.7 | 504.4 | 490.3 | 482.5 | 535.8 | 556.7 | 586.2 |

TABLE 2

| | 8 | 9 | 10 | 11 | 12 | 13 | 14 |
|---|---|---|---|---|---|---|---|
| Thickness (mm) | 3.90 | 3.80 | 3.94 | 3.79 | 4.04 | 3.89 | 3.89 |
| Composition | | | | | | | |
| % $Fe_2O_3$ | 0.600 | 0.650 | 0.650 | 0.650 | 0.650 | 0.600 | 0.600 |
| % Ferrous (Redox) | 29.7 | 33.1 | 32.7 | 33.3 | 33.5 | 38.3 | 36.1 |
| % FeO | 0.178 | 0.215 | 0.212 | 0.216 | 0.218 | 0.230 | 0.217 |
| ppm Se | 0.0 | 0.0 | 0.0 | 0.0 | 0.0 | 0.0 | 0.0 |
| ppm CuO | 0 | 0 | 150 | 300 | 450 | 0 | 150 |
| % $TiO_2$ | 0.8 | 1.0 | 1.0 | 1.0 | 1.0 | 0.8 | 0.8 |
| % $Er_2O_3$ | 2.0 | 1.2 | 1.2 | 1.2 | 1.2 | 1.2 | 1.2 |
| % Carbon | 0.048 | 0.060 | 0.060 | 0.060 | 0.060 | 0.065 | 0.065 |
| % Tuv | 27.8 | 26.1 | 24.0 | 26.8 | 26.3 | 30.7 | 29.0 |
| % $T_{LA}$ | 70.5 | 68.8 | 62.9 | 69.6 | 69.6 | 67.7 | 63.3 |
| % Ts | 47.1 | 43.2 | 40.1 | 43.6 | 42.5 | 41.9 | 40.5 |
| L* | 87.1 | 86.5 | 83.5 | 86.9 | 86.9 | 86.2 | 83.9 |
| a* | 0.6 | −3.0 | −2.9 | −3.1 | −3.2 | −3.1 | −2.9 |
| b* | 1.2 | 4.0 | 3.5 | 3.7 | 3.8 | 1.2 | 1.2 |
| % Purity | 1.2 | 4.1 | 3.5 | 3.7 | 3.4 | 0.9 | 1.1 |
| Dominant wavelength (nm) | 591.2 | 565.9 | 559.9 | 561.2 | 554.9 | 512.5 | 521.1 |

TABLE 3

| | 15 | 16 | 17 | 18 | 19 | 20 | 21 |
|---|---|---|---|---|---|---|---|
| Thickness (mm) | 3.94 | 3.88 | 3.76 | 4.01 | 4.16 | 4.07 | 4.00 |
| Composition | | | | | | | |
| % $Fe_2O_3$ | 0.600 | 0.600 | 0.600 | 0.600 | 0.600 | 0.600 | 0.600 |
| % Ferrous (Redox) | 40.5 | 43.6 | 27.1 | 26.4 | 26.1 | 25.6 | 23.3 |
| % FeO | 0.243 | 0.262 | 0.163 | 0.158 | 0.157 | 0.153 | 0.140 |
| ppm Se | 0.0 | 0.0 | 0.0 | 0.0 | 0.0 | 0.0 | 0.0 |
| ppm CuO | 300 | 450 | 75 | 75 | 75 | 75 | 60 |
| % $TiO_2$ | 0.8 | 0.8 | 0.6 | 0.6 | 0.6 | 0.6 | 0.7 |
| % $Er_2O_3$ | 1.2 | 1.2 | 0.8 | 1.2 | 1.6 | 2.0 | 1.7 |
| % Carbon | 0.065 | 0.065 | 0.050 | 0.050 | 0.050 | 0.050 | 0.045 |
| % Tuv | 27.4 | 30.9 | 36.3 | 33.1 | 32.5 | 31.4 | 30.4 |
| % $T_{LA}$ | 66.0 | 69.5 | 76.3 | 72.1 | 72.3 | 71.1 | 73.9 |
| % Ts | 39.9 | 40.9 | 52.6 | 50.0 | 49.5 | 49.3 | 52.4 |
| L* | 85.3 | 87.2 | 90.2 | 88.2 | 88.1 | 87.7 | 88.7 |
| a* | −3.6 | −4.2 | −2.4 | −0.5 | 0.3 | 1.5 | 0.9 |
| b* | 1.7 | 1.5 | 1.1 | 0.5 | 0.1 | −0.2 | 1.2 |
| % Purity | 1.3 | 1.3 | 1.0 | 0.4 | 0.2 | 0.4 | 1.4 |
| Dominant wavelength (nm) | 524.7 | 510.1 | 538.9 | 552.9 | 570.8 | 577.5 | 592.1 |

TABLE 4

|  | 22 | 23 | 24 | 25 | 26 | 27 | 28 |
|---|---|---|---|---|---|---|---|
| Thickness (mm) | 4.17 | 4.07 | 3.90 | 4.01 | 4.03 | 4.05 | 4.10 |
| Composition |  |  |  |  |  |  |  |
| % $Fe_2O_3$ | 0.600 | 0.600 | 0.600 | 0.600 | 0.600 | 0.600 | 0.600 |
| % Ferrous (Redox) | 27.5 | 29.5 | 23.2 | 24.2 | 23.4 | 24.3 | 24.4 |
| % FeO | 0.165 | 0.177 | 0.139 | 0.145 | 0.141 | 0.146 | 0.147 |
| ppm Se | 0.0 | 0.0 | 0.0 | 1.5 | 6.0 | 7.1 | 0.0 |
| ppm CuO | 60 | 60 | 60 | 60 | 60 | 60 | 60 |
| % $TiO_2$ | 0.7 | 0.7 | 0.4 | 0.4 | 0.4 | 0.4 | 0.6 |
| % $Er_2O_3$ | 1.7 | 1.7 | 1.5 | 1.5 | 1.5 | 1.5 | 1.7 |
| % Carbon | 0.050 | 0.055 | 0.055 | 0.055 | 0.055 | 0.055 | 0.062 |
| % Tuv | 30.1 | 30.3 | 36.9 | 35.4 | 33.8 | 32.4 | 35.0 |
| % $T_{LA}$ | 70.9 | 70.7 | 74.0 | 72.9 | 68.3 | 66.6 | 74.9 |
| % Ts | 47.6 | 46.8 | 53.6 | 51.8 | 50.0 | 48.3 | 52.2 |
| L* | 87.4 | 87.3 | 88.9 | 88.3 | 86.0 | 85.1 | 89.3 |
| a* | 0.0 | −0.4 | 0.5 | 0.9 | 1.3 | 1.2 | 0.8 |
| b* | 0.6 | 0.6 | −0.8 | 0.2 | 0.6 | 0.8 | −0.1 |
| % Purity | 0.6 | 0.7 | 0.6 | 0.4 | 1.0 | 1.1 | 0.3 |
| Dominant wavelength (nm) | 587.1 | 575.8 | 484.7 | 497.3 | 602.2 | 594.8 | 542.3 |

TABLE 5

|  | 29 | 30 | 31 | 32 | 33 | 34 | 35 |
|---|---|---|---|---|---|---|---|
| Thickness (mm) | 3.82 | 4.15 | 4.15 | 4.53 | 4.33 | 4.22 | 4.03 |
| Composition |  |  |  |  |  |  |  |
| % $Fe_2O_3$ | 0.600 | 0.600 | 0.600 | 0.625 | 0.625 | 0.625 | 0.625 |
| % Ferrous (Redox) | 25.3 | 25.8 | 24.9 | 25.2 | 25.2 | 35.0 | 40.6 |
| % FeO | 0.152 | 0.155 | 0.150 | 0.157 | 0.158 | 0.219 | 0.254 |
| ppm Se | 1.0 | 0.1 | 2.4 | 0.0 | 0.0 | 0.0 | 0.0 |
| ppm CuO | 60 | 60 | 60 | 50 | 50 | 50 | 50 |
| % $TiO_2$ | 0.6 | 0.6 | 0.6 | 0.6 | 0.6 | 0.6 | 0.6 |
| % $Er_2O_3$ | 1.7 | 1.7 | 1.7 | 1.9 | 1.9 | 1.9 | 1.9 |
| % Carbon | 0.062 | 0.062 | 0.062 | 0.050 | 0.060 | 0.070 | 0.080 |
| % Tuv | 35.5 | 34.3 | 34.1 | 28.8 | 30.9 | 28.8 | 31.3 |
| % $T_{LA}$ | 74.7 | 75.1 | 72.4 | 70.4 | 71.5 | 66.5 | 68.8 |
| % Ts | 52.7 | 51.1 | 50.4 | 46.8 | 48.1 | 41.2 | 40.6 |
| L* | 89.1 | 89.3 | 88.0 | 87.1 | 87.6 | 85.5 | 86.8 |
| a* | 0.9 | 0.8 | 1.0 | 0.8 | 0.8 | −1.0 | −2.1 |
| b* | 0.2 | 0.5 | 0.6 | 0.6 | 0.4 | −0.3 | −1.0 |
| % Purity | 0.7 | 1.0 | 1.0 | 0.8 | 0.6 | 0.8 | 1.9 |
| Dominant wavelength (nm) | 562.6 | 564.8 | 554.3 | 594.2 | 600.9 | 485.8 | 483.9 |

The physical properties, like light transmission, are variables that are calculated based on internationally accepted standards. Therefore, light transmission is evaluated using Illuminant "A" and the 2 degree Standard Observer also known as 1931 (Publication C.I.E. 15.2, ASTM E-308 (1990)]. The wavelength range used for these purposes is from 380 to 780 ηm, integrating values in numeric format at intervals of 10 ηm. The transmission of solar energy represents the heat that the glass gains directly, measured from 300 ηm to 2150 ηm at intervals of 50, 10, 50 ηm, the numeric form of calculation employs the recognized ISO/DIS 13837 standard.

The calculation of the ultraviolet (UV) radiation only involves the participation of solar UV radiation, and therefore is evaluated within the range of 300 ηm to 400 ηm at 5 ηm intervals; the numeric form of calculation employs the recognized ISO/DIS 13837 standard. The only part of the infrared (IR) radiation transmission that is measured, as with the UV radiation, is the range where the solar spectrum has influence, and therefore the range of the near infrared region from 800 to 2150 ηm is used, at intervals of 50 ηm. Both calculations used the ISO/DIS 13837 values for solar radiation mentioned above.

The amount of solar heat that is transmitted through the glass can also be calculated as the contribution of thermal energy present in each of the regions where the solar spectrum has influence, which is from the ultraviolet region (280 ηm) to the near infrared region (2150 ηm), which is 3% for UV, 44% for the visible spectrum and around 53% for IR; however the direct solar energy transmission values in the present invention are calculated based on a numerical integration taken into account the entire range of the solar spectrum, from 300 to 2150 ηm, with intervals of 50 ηm, and employing the solar radiation values reported by standard ISO/DIS 13837.

The specifications for determining color, such as the dominant wavelength and excitation purity, have been derived from the Tristimulus values (X, Y, Z) which have been adopted by the International Commission on Illumination (CIE), as a direct result of experiments involving many observers. These specifications can be determined by calculating the trichromatic coefficients x, y, z for the Tristimulus values, which correspond to the colors red, green and blue respectively. The trichromatic values are plotted on a chromaticity diagram and compared with the coordinates of Illuminate "C", considered to be the illumination standard. This comparison provides the information needed to determine the excitation purity of the color and its dominant wavelength. The dominant wavelength defines the wavelength of the color and its value is located within the visible spectrum, from 380 to 780 ηm, whereas for excitation purity, the lower the value, the closer the color is to being neutral. A deeper understanding of these issues can be obtained from the "Handbook of Colorimetry", by Arthur C. Hardy, published by the Massachusetts Institute of Technology in 1936.

The above has been a description of a neutral grey glass and it will be apparent to all experts in the field that other possible advances or improvements can be made, which can be considered within the field determined by the following claims.

The invention claimed is:

1. A neutral grey glass composition, with a sodium-calcium-silicate base consisting essentially of: $SiO_2$ from 68 to 75% wt; $Al_2O_3$ from 0 to 5% wt.; CaO from 5 to 15% wt; MgO from 0 to 10% wt; $Na_2O$ from 10 to 18% wt; $K_2O$ from 0 to 5% wt.; $SO_3$ from 0.05 to 0.30% wt., and the following primary colorants: $Fe_2O_3$ from 0.40 to 0.80% wt., $TiO_2$ from 0.05 to 2.0% wt; $Er_2O_3$ from 0.2 to 2.5% wt.; Se from 0 to <10 ppm; CuO from 20 to 200 ppm; 0.0 to 0.1% wt. carbon; and 15 to 50% ferrous (redox), in which the glass has an illuminant "A" light transmission of greater than 65%, solar transmission $(T_s)$<55%, ultraviolet transmission <40%, with color values of a*=−4 to 3, and b*=4 to −2.

2. The glass composition described in claim 1, in which selenium comprises between around 0.1 to around 7.1 ppm of the glass composition, to complement the reddish coloring used to adjust the green color.

3. The glass composition according to claim 1, in which said glass is produced with a thickness of between 3.74 mm and 4.53 mm.

4. The glass composition according to claim 1, in which the CuO ranges are between 50 and 450 ppm, for a glass thickness of between 3.76 mm and 4.04 mm.

5. A glass composition in accordance with claim 1, in which the range of CuO is less than 75 ppm, for a glass thickness of between 3.76 mm and 4.53 mm.

6. A glass composition in accordance with claim 1, in which the composition has a dominant wavelength of from 482.5 nm to 602.2 nm, and an excitation purity of at least 4.6.

* * * * *